June 28, 1949.  T. E. MILLER  2,474,749
SELF-ADJUSTING HYDRAULIC BRAKE MECHANISM
Filed Aug. 27, 1945  2 Sheets-Sheet 1

INVENTOR.
THEODORE E. MILLER
BY
Parry + Miller
Attorneys

INVENTOR.
THEODORE E. MILLER
BY
Parry + Miller
Attorneys

Patented June 28, 1949

2,474,749

UNITED STATES PATENT OFFICE 2,474,749

SELF-ADJUSTING HYDRAULIC BRAKE MECHANISM

Theodore E. Miller, Detroit, Mich.

Application August 27, 1945, Serial No. 612,883

13 Claims. (Cl. 188—152)

1

This invention relates to hydraulic or fluid operated brakes for automobiles and other purposes, and is directed to improved self-adjusting mechanism operated by the braking fluid to compensate for wear of the brake lining and maintain a predetermined release clearance between the brake shoe and its coacting braking surface regardless of the condition of the brake lining.

One object of the invention is to provide a wear-compensating mechanism so constructed as to be extremely reliable in operation and adapted to accurately maintain the desired release clearance under all conditions and with a high degree of precision.

A further object of the invention is to provide a mechanism of such character that it may be installed as a unit in any conventional type of brake operating cylinder without necessitating any change in construction of the cylinder or brake actuating piston.

A still further object of the invention is to provide wear-compensating mechanism wherein the brake operating fluid is employed in a novel manner to effectively compensate for wear.

Another object of the invention is to provide a wear-compensating mechanism employing the brake operating fluid to control the release position of the brake shoe and its actuating piston without trapping a body of fluid in the piston chamber in supporting contact with the piston.

Still another object of the invention is to provide a fluid operated wear-compensating mechanism which maintains proper release clearance through a trapped body of brake fluid sealed from communication with the brake cylinder and the brake actuating piston, so that the release position of the brake is determined independently of fluid conditions in the cylinder.

In prior fluid operated wear-compensating devices for hydraulic brakes it is the usual practice to divide the cylinder into an entrance chamber and a trap chamber intermediate the entrance chamber and the brake actuating piston and locate a one way valve between the two chambers. When fluid pressure is supplied to the cylinder under control of a brake pedal or other actuator, the fluid is freely transmitted from the entrance into the trap chamber to act upon the piston and cause the same to engage the brake shoe. When the fluid pressure is released from the entrance chamber a portion of the fluid is trapped in the trap chamber so as to form a fluid stop to limit the release traverse of the brake actuating piston. Since the trap chambers are determined by the area of the brake actuating piston, and are of a

2 diametrical dimension which is substantially greater than lengthwise chamber dimension and length in relation to the increases resulting from the small changes in piston movement under gradual wear of the brake lining, it is difficult to make such a device sufficiently sensitive to maintain a predetermined release clearance with the desired degree of accuracy.

In particular, it is difficult to trap the proper volume of fluid in the relatively large capacity trap chamber to stop the piston at the appropriate position in the cylinder to maintain a predetermined release clearance of the brake, and to so vary the liquid volume as to adjust the release stop position of the piston in exact proportion to the amount of brake wear. In many instances expansible disphragms or other deformable bodies are employed as a pressure actuating trap valve which may or may not close at exactly the right time, and which are likely to leak during prolonged periods of brake inaction, resulting in failure of the wear-compensating mechanism to function reliably.

To overcome these and other difficulties of prior devices, the present invention provides a wear-compensating mechanism entirely auxiliary to the brake operating piston and which functions without dependance on the continuous maintenance of a body of fluid in the brake piston cylinder. This is accomplished by providing an adjustable capacity fluid trapping chamber separate from the fluid chamber supplying the fluid to actuate the brake piston. The size of such chamber will be adjusted in response to changes in the traverse of the piston through positive physical means, and the amount of liquid trapped in the auxiliary chamber is accurately and reliably controlled through positive actuated valve mechanism.

The invention will be understood and its advantages over prior constructions more fully appreciated from the illustrative embodiment thereof shown in the accompanying drawings, and the description which follows.

Figure 3:
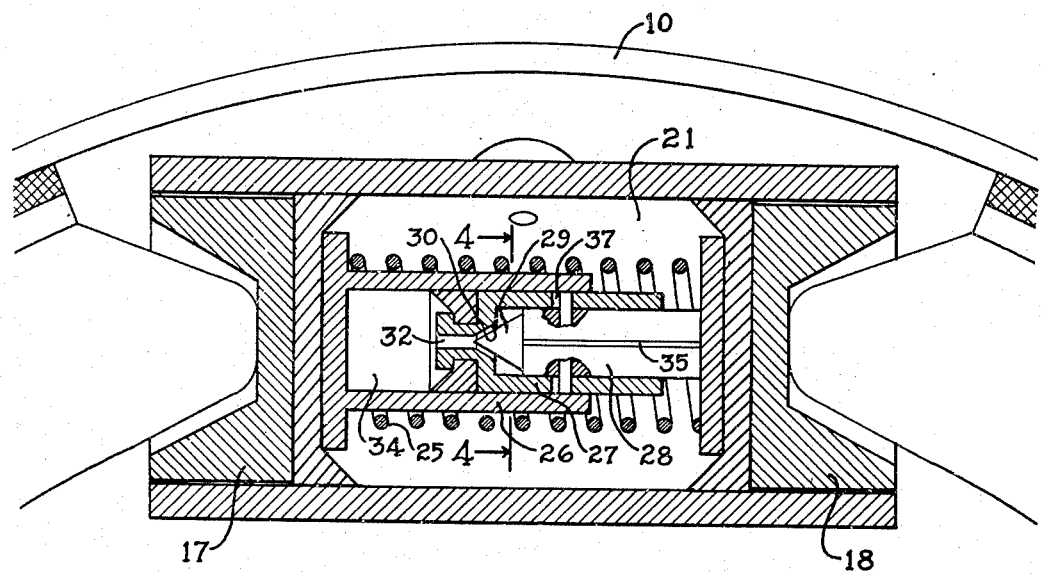
Figure 4:
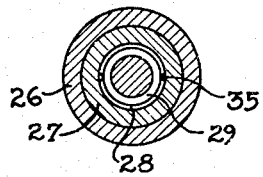

In such drawings:

Fig. 3 is a longitudinal section similar to Fig. 2 with the operating parts shown in the position assumed when the brake is applied; and, Fig. 4 is a transverse section taken on line 4—4 of Fig. 3.

Referring more particularly to the drawing, the wear-compensating mechanism is shown in conjunction with one conventional form of automobile brake wherein two brake shoes are simultaneously and oppositely actuated by separate pistons working in a common fluid pressure cylinder.

Figure 1:
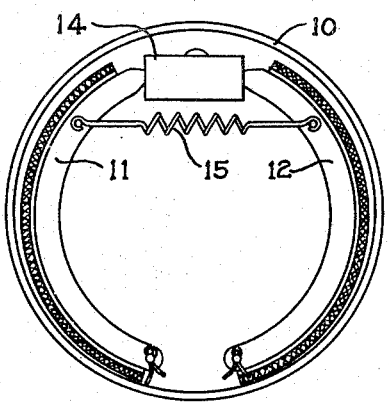
Fig. 1 is a diagrammatic view of a conventional form of hydraulic brake.
Figure 2:
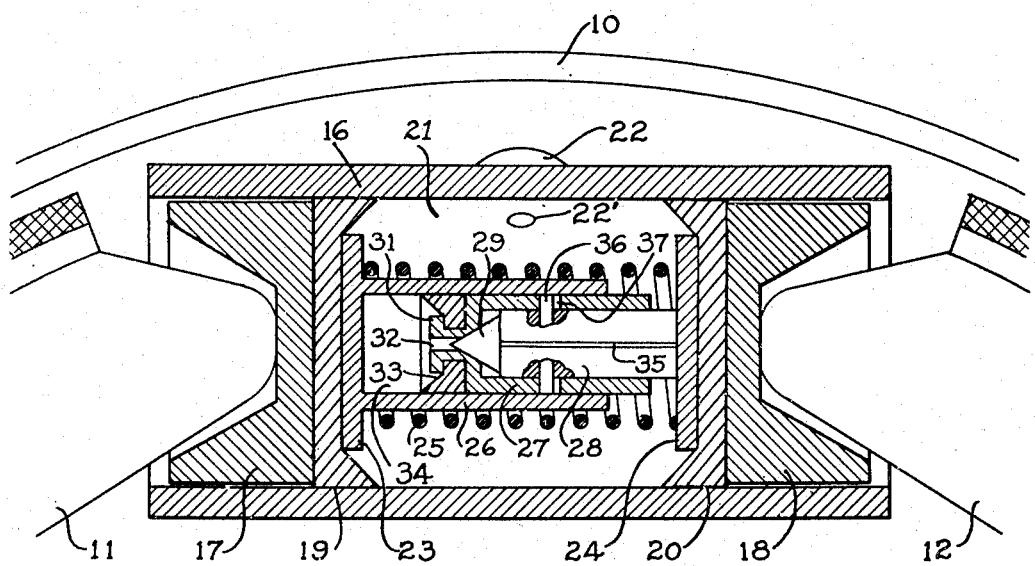
Fig. 2 is a longitudinal section of the hydraulic brake actuating mechanism of Fig. 1 with the wear-compensating mechanism of the present invention installed therein, and showing the position assumed by the parts when the brake is released.

Referring to Figs. 1 and 2, a conventional rotary brake drum, as for an automobile wheel, is indicated at 10. Coactive with the drum are a pair of conventional brake shoes 11 and 12. The fluid operated brake actuating mechanism, generally designated 14, includes the stationary cylinder 16 in which work in opposite directions brake actuating pistons 17 and 18 for the respective brake shoes 11 and 12. Backing such pistons are flexible sealing cups 19 and 20 of rubber or other suitable material. Located in the cylinder between the pistons is a common fluid pressure chamber 21 to which fluid is supplied under control of a brake pedal or other suitable control through line 22 and inlet port 22'. A tension spring 15 interconnects brake shoes 11 and 12 so as to return the shoes and their actuating pistons 17 and 18 to released position after actuation when the pressure in chamber 21 is relieved following actuation of the brakes by pistons through the building up of fluid pressure in chamber 21. It may be observed that actuation and release of the brake pistons depends on the fluid pressure in cylinder chamber 21 and that the self-adjusting wear-compensating mechanism requires no alteration in this arrangement.

Seating in chamber 21 against the inner side of piston sealing cups 19 and 20 and held thereagainst by expansion spring 25 are a pair of rigid discs 23 and 24. As will hereafter more fully appear discs 23 and 24 are relatively movable and function as stop means determining the released position of the pistons. Extending axially from one of the discs 23, and concentric therewith is a cylinder 26 of substantially smaller diameter than main cylinder 16. Slidable in such cylinder is a hollow piston 27, and slidable in the bore in such piston is a cylindrical valve stem 28 secured axially of the second of said discs, 24.

Secured to the left end of valve stem 28 is a conical needle valve body 29 engageable with valve seat 30 formed in the left end of piston cylinder 27. Projecting from the piston cylinder is a reduced shouldered extension 31 formed with an axial fluid passage 32 communicating with the interior of the piston cylinder and controlled by valve 29. Mounted on extension 31 is a flexible sealing cup 33.

A fluid trap chamber 34 is formed in the left end of cylinder 26 which is adjustable in size to accommodate a varying volume of fluid through longitudinal movement in cylinder 26 of piston cylinder 27. In Fig. 2 valve stem 28 is in its left end position so that valve 29 engages seat 30, and trap chamber 34 is sealed. When valve stem 28 moves to the right relative to piston cylinder 27 the valve is opened, and fluid may flow from cylinder chamber 21 along valve stem 28 into trap chamber 34. To that end the diameters of the valve stem and interior of piston cylinder 27 may be proportioned to provide a slight clearance sufficient to permit passage of the fluid or, as shown, suitable bores or grooves 35 may be formed lengthwise of the valve stem.

While cylinder 26 and valve stem 28 are oppositely and independently movable with the brake actuating pistons 17 and 18 and sealing cups 19 and 20, piston cylinder 27 is capable of axial movement in cylinder 26, and valve stem 28 is capable of limited axial movement in and relative to the piston cylinder to effect opening and closing of the trap chamber valve 29. A lost motion connection is provided between valve stem 28 and piston cylinder 27 so that initial movement of the valve stem a predetermined distance to the right will be accomplished without movement of piston cylinder 27 so that valve 29 will open, and thereafter further movement of the valve stem to the right will cause corresponding movement of piston cylinder 27 in cylinder 26 to increase the length of trap chamber 34. Conversely, movement of valve stem 28 to the left will be accomplished free of movement of piston cylinder 27 by reason of the lost motion connection so that valve 29 will close.

As will hereafter become clear movement of the valve stem to the right sufficient to move piston cylinder 27 only occurs at certain times, and even where this occurs reverse movement of the valve stem to the left is not sufficient to move piston cylinder to the left after the valve is closed. In the present instance the lost motion connection between valve stem 28 and piston cylinder 27 comprises a transverse pin in the stem working between the opposite ends of axially extending slots 37 in the piston cylinder. The length of such slot is determined by the release clearance desired between the linings of brake shoes 11 and 12 and brake drum 10.

When the brake shoes 11 and 12 are in their retracted position the parts of the brake actuator will be as shown in Fig. 2 under the action of tension spring 15 which is substantially stronger than compression spring 25. When a pedal or other control is actuated to force fluid through port 22' into cylinder chamber 21, which may be termed the piston chamber, sealing cups 19 and 20 and pistons 17 and 18 will be forced outwardly in opposite directions to move brake shoes 11 and 12 into engagement with brake drum 10. Until the pistons are moved trap chamber 34 is sealed against communication with chamber 21 by valve 29. Movement of the pistons causes relative movement in opposite directions by compression spring 25 of valve stem 28 and piston cylinder 27 to open the valve. It may be noted that when, as in the embodiment shown, discs 23 and 24 are secured to the outer ends of cylinder 26 and valve stem 28 opening of the valve may be assisted by fluid pressure in chamber 21 acting against such discs. However, the primary function of the discs is to center the wear-compensating unit in chamber 21, also to act as brake piston release stop means.

If the brake linings have not worn so that movement of valve stem 28 relative to piston cylinder 27 is no greater than the length of slot 37 of the lost motion connection between the valve stem and the piston cylinder, the piston cylinder remains stationary in cylinder 26 so that the capacity of trap chamber 34 remains unchanged. Upon release of fluid pressure from chamber 21 the pistons are retracted towards each other under action of spring 15, and this results in moving valve stem 28 and piston cylinder 27 inwardly in opposite directions until valve 29 engages its seat to seal the trap chamber and at that time discs 23 and 24 discontinue their inward movement to stop further retracting movement of the pistons and the brake shoes.

It will be understood that fluid always fills the trap chamber to capacity and that under the indicated conditions opening of valve 29 will not result in fluid flow to or from the trap chamber, the pressure in such chamber and chamber 21 being the same. Further, since the pressure in the trap chamber acting on the left side of piston cylinder 26 is never greater than that in chamber 21 acting on the right side there is no tendency of the piston cylinder moving to the right against valve 29 to accidentally close the valve while the brake shoes are engaged and prevent their release.

When the linings of the brake shoes have worn the pistons must move farther apart to effect braking action. Under such circumstances valve stem 28 after moving outwardly relative to piston cylinder 27 for the valve opening operation will engage its pin 36 with the right end of slot 37 and further outward movement of the pistons will cause the valve stem through such pin to draw piston 27 to the right, thereby increasing the length of trap chamber 34. As a consequence, a low pressure area will be created in the trap chamber and fluid will be drawn therein to the amount of the increased chamber capacity. When the pedal is released to disperse the fluid pressure in chamber 21 the brake shoes and the pistons will be drawn together by tension spring 15. During such movement valve stem 28 will move inwardly to the limit of the lost motion connection relative to piston cylinder 27 to close the valve, trapping the fluid in the now enlarged trap chamber 34, and thus preventing piston cylinder 27 from moving back to the left to its original position and preventing further retractive movement of the brake shoes and the pistons.

It will be understood, as above noted, that the length of the traverse of pin 36 in slot 37 will determine the release position of the brake shoes, the length of traverse of valve stem 28 relative to piston cylinder 27 and, in the absence of wear, the length of movement of the brake shoes between released and braking positions. The extent of wear of the brake shoe linings will determine the extent to which piston cylinder 27 is moved to the right by valve stem 28 relative to cylinder 26 and the extent of increase in size of trap chamber 34. As the brake linings gradually wear under repeated brake operation piston cylinder 27 is gradually drawn farther and farther to the right so as to progressively increase the capacity of trap chamber 34 and compensate for even the slightest increase of lining wear with the highest degree of precision so that the brake release clearance always remains the same.

The self-adjusting wear-compensating mechanism of the invention as herein described constitutes a self-contained unit which may be installed in any hydraulic brake actuator cylinder and will determine the release clearance in accordance with the limits set by the lost motion connection between certain parts of the unit. It may be desirable to have different release clearances in different brake installations, and for such purposes it is merely necessary to adjust the operating range of the lost motion connection, as by providing a series of pins 36 of different diameters. Since trap chamber 34 functions independently of the size of the piston chamber 21, the same unit may be installed in brake actuating cylinders of various sizes.

Essentially the invention comprises a fluid trap chamber separate from the brake actuating piston chamber wherein fluid is trapped to limit and automatically determine the release clearance of the brake. By isolating the trap chamber from the piston it is unnecessary to maintain a body of fluid behind the piston as in prior devices. Also, since the trap chamber can be made of relatively small size in relation to the size of the cylinder and piston chamber and the size of the chamber and the admission of fluid thereto are positively controlled by parts actuatable in response to piston movement, my wear-compensating mechanism is adapted to operate with a greater degree of reliability and precision than prior devices.

The details of construction of the particular embodiment of the invention here illustrated and described are not to be taken as limiting, since the invention may be constructed in a variety of forms.

The actual size of the unit is substantially smaller than shown in the drawings, having been enlarged in its entirety and the relative proportions of some parts having been exaggerated for purposes of clarity.

I claim:

1. A brake wear-compensating unit for a piston and cylinder fluid pressure brake actuator comprising means forming a self-contained fluid expansible trap chamber, valve means, a valve actuating member connecting with the valve means adapted to open the valve means to admit fluid to said chamber in response to brake-actuating movement of a brake piston and adapted to close the valve means to trap fluid in said chamber in response to brake-releasing piston movement, means adapted to vary the fluid capacity of said chamber actuatable by the valve actuating member and brake piston release stop means adapted to be controlled by the volume of fluid trapped in the chamber.

2. A brake wear-compensating unit for a piston and cylinder fluid pressure brake actuator comprising means forming a self-contained fluid trap chamber, valve means adapted to admit fluid to said chamber, and means for opening the valve means in response to brake-actuating movement of predetermined length of a brake piston and adapted to close the valve means to trap fluid in the chamber in response to brake releasing piston movement, means for increasing the liquid holding capacity of the chamber becoming operable in response to brake-actuating piston movement in excess of said predetermined movement to which the actuating means for the valve means responds, and brake piston release stop means adapted to be controlled by the volume of liquid trapped in the chamber.

3. A brake wear-compensating unit for a piston and cylinder fluid pressure brake actuator comprising means forming a self-contained fluid trap chamber, valve means controlling the admission of fluid to said chamber, a member slidable in said chamber to vary the fluid capacity thereof, means adapted to respond to brake actuating movement of a brake piston to open said valve means and adapted to respond to brake releasing piston movement to close said valve means, and means including a lost motion connection adapted to move said slidable member to increase the chamber fluid capacity in response to brake actuating piston movement.

4. A brake wear-compensating unit for a piston and cylinder fluid pressure brake actuator comprising a cylinder forming a self-contained fluid trap chamber, a piston slidable in said cylinder to vary the fluid capacity of said trap chamber, valve means controlling the admission of fluid to said chamber, means adapted to respond to brake-operating piston movement for actuating said valve means and means responsive to movement of the valve means for actuating said chamber piston.

5. A brake wear-compensating unit for a piston and cylinder fluid pressure brake actuator comprising a cylinder forming a self-contained fluid trap chamber, a piston slidable in said cylinder to vary the fluid capacity of said trap chamber, valve means controlling the admission of fluid to said chamber, means adapted to move relative to the chamber piston for actuating the valve means and means actuatable by said valve actuating means for actuating said chamber piston.

6. A brake wear-compensating unit for a piston and cylinder fluid pressure brake actuator comprising a cylinder forming a self-contained fluid trap chamber, a piston slidable in said chamber and adapted to vary the liquid capacity thereof, a valve controlling the admission of fluid to the chamber, actuating means for opening the valve independently of said chamber piston in response to limited brake-actuating movement of a brake piston and adapted to close said valve independently of the chamber piston upon brake releasing piston movement, and actuating means for moving said chamber piston outwardly of the cylinder after said valve has opened in response to further brake actuating piston movement, and means controlled by the position of the chamber piston when said valve is closed for limiting brake releasing piston movement.

7. A brake wear-compensating unit for a piston and cylinder fluid pressure brake actuator comprising a cylinder forming a self-contained fluid trap chamber, a hollow piston slidable in said chamber having an open end facing outwardly of the chamber, a fluid passage through the inner end of said piston for admitting fluid from the piston bore into the trap chamber, a valve member slidable in the piston bore controlling said passage, actuating means adapted to operate simultaneously with predetermined brake-actuating movement of a brake piston to move said valve member and said piston outward relative to one another to admit fluid to the fluid trap chamber and to move said valve member and said chamber piston as a unit and said cylinder relatively outward during further brake-actuating piston movement, and said actuating means being adapted to operate simultaneously with brake-releasing piston movement to move the valve member and chamber piston inward relative to one another to close the valve and trap a body of fluid in the trap chamber adapted to support the chamber piston against inward movement relative to said cylinder, and piston release stop means adapted to be adjustably positioned by said chamber piston.

8. A fluid operated brake actuator comprising a cylinder, a brake actuating piston in said cylinder, inlet means for admitting fluid into the cylinder, an adjustable fluid capacity second cylinder, means for admitting fluid to said second cylinder from the first cylinder in response to brake actuating movement of the brake piston in the first cylinder and for sealing said second cylinder against the escape of liquid therefrom in response to brake releasing movement of the brake piston, means becoming operative only in response to brake actuating movement of the brake piston beyond a predetermined limit for increasing the fluid capacity of the second cylinder, and brake piston release stop means controlled by the fluid capacity of the second cylinder.

9. A fluid operated brake actuator comprising a cylinder forming a piston chamber, a brake actuating piston in said chamber, fluid inlet means in the cylinder opening into the piston chamber, a housing in the cylinder forming a fluid tight second chamber, a second piston slidable in said second chamber, means connecting with said second piston responsive to selected brake actuating movement of the brake piston to effect relative outward movement of said housing and second piston to increase the capacity of the second chamber, a fluid passage for admitting fluid from the cylinder into the second chamber and valve means responsive to brake releasing movement of the brake piston to trap fluid in said second chamber for supporting said housing and second piston against relative inward movement, and a brake piston release stop member controlled by the relative position of said housing and second piston.

10. A fluid operated brake actuator comprising a cylinder forming a piston chamber, a brake actuating piston in said chamber, fluid inlet means opening into the piston chamber, means in the cylinder forming a fluid-tight second chamber, valve means opening in response to brake actuating movement of the piston for admitting fluid from the cylinder into said second chamber and closing in response to brake-releasing piston movement to trap liquid in the second chamber, a piston in said liquid trapping second chamber to different positions therein and adapted to be supported by liquid trapped therein when the valve is closed, and brake piston release stop means controlled by the position of the piston in said liquid trapping chamber.

11. A fluid pressure brake actuator comprising a cylinder housing a main chamber, a brake-actuating piston working in said main chamber, an inlet in the cylinder for admitting operating fluid into said main chamber, means comprising relating movable parts forming a variable fluid capacity auxiliary fluid-tight trap chamber separate from the main cylinder chamber, valve means operative to admit fluid from the main cylinder chamber into the trap chamber in response to brake-actuating movement of the brake piston and operative to close in response to brake-releasing movement of the brake piston, actuating means operative in response to brake-actuating movement of the brake piston for effecting relative movement of said parts forming the variable capacity trap chamber to increase the fluid capacity of the trap chamber, and a movable piston stop in the main cylinder chamber for varying the brake released position of the brake piston and controlled by the volume of fluid trapped in the trap chamber.

12. A brake wear compensating unit for a piston and cylinder fluid pressure brake actuator comprising a longitudinally expansible chamber cylinder forming a fluid tight trap chamber and adapted to be mounted lengthwise in and surrounded by the chamber of a brake actuator cylinder for expansion therein, means for admitting and sealing in the trap chamber of the expansible cylinder fluid from the chamber of an actuator cylinder when said expansible cylinder is operatively mounted therein, and movable stop means adapted to be controlled by the volume of fluid sealed in the trap chamber of the expansible cylinder for determining the release position of the actuator piston in an actuator cylinder.

13. A brake wear compensating unit for a piston and cylinder fluid pressure brake actuator comprising a longitudinally expansible chamber cylinder forming a fluid tight trap chamber and adapted to be mounted lengthwise in and surrounded by the chamber of a brake actuator cylinder for expansion therein, longitudinally reciprocable valve means in one end of the expansible cylinder adapted to open in response to brake actuating movement of an actuator piston when said expansible cylinder is operatively positioned in a brake actuator cylinder to admit fluid from the actuator cylinder into the trap chamber and adapted to close upon brake releasing movement of the actuator piston to trap fluid in said trap chamber, and stop means adapted to be controlled by the volume of fluid sealed in the trap chamber of the expansible cylinder for determining the release position of an actuator piston in the actuator cylinder.

THEODORE E. MILLER.

REFERENCES CITED

The following references are of record in the file of this patent:

UNITED STATES PATENTS

| Number | Name | Date |
| --- | --- | --- |
| 2,240,792 | Liebreich | May 6, 1941 |
| 2,251,379 | Van Der Hof | Aug. 5, 1941 |